(12) United States Patent
Kobayashi et al.

(10) Patent No.: US 12,462,987 B2
(45) Date of Patent: Nov. 4, 2025

(54) POWER STORAGE DEVICE

(71) Applicant: Panasonic Intellectual Property Management Co., Ltd., Osaka (JP)

(72) Inventors: Toshitaka Kobayashi, Osaka (JP); Hiroki Hayashi, Kyoto (JP); Eiko Ishii, Osaka (JP); Hideki Shimamoto, Kyoto (JP); Ryota Morioka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 80 days.

(21) Appl. No.: 18/260,316

(22) PCT Filed: Dec. 20, 2021

(86) PCT No.: PCT/JP2021/047005
§ 371 (c)(1),
(2) Date: Jul. 3, 2023

(87) PCT Pub. No.: WO2022/163210
PCT Pub. Date: Aug. 4, 2022

(65) Prior Publication Data
US 2024/0170227 A1  May 23, 2024

(30) Foreign Application Priority Data
Feb. 1, 2021 (JP) .................................. 2021-014468

(51) Int. Cl.
*H01G 9/12* (2006.01)
*H01G 9/10* (2006.01)
(Continued)

(52) U.S. Cl.
CPC ................. *H01G 9/12* (2013.01); *H01G 9/10* (2013.01); *H01G 11/80* (2013.01); *H01M 50/107* (2021.01)

(58) Field of Classification Search
None
See application file for complete search history.

(56) References Cited

U.S. PATENT DOCUMENTS 6,452,784 B2 * 9/2002 Nakada ..................... H01G 9/00
29/25.03
2009/0086411 A1 * 4/2009 Miura ..................... H01G 11/80
361/521
(Continued)

FOREIGN PATENT DOCUMENTS

JP          56-012342 U      2/1981
JP          03274659 A   *  12/1991
(Continued)

OTHER PUBLICATIONS

Translation JP H03274659A.*
International Search Report of PCT application No. PCT/JP2021/047005 dated Mar. 15, 2022.

*Primary Examiner* — Eric W Thomas
(74) *Attorney, Agent, or Firm* — Rimon P.C.

(57) ABSTRACT

A power storage device of the present disclosure includes: a power storage element; a case that houses the power storage element, the case having a bottomed tubular shape and including an opening at one end of the case; and a sealing body that seals the opening. The case includes a first pressing part and a second pressing part in a vicinity of the opening. The first pressing part presses a side surface of the sealing body and protrudes to an inside of the case, and the second pressing part presses an upper surface of the sealing body. The sealing body includes a slit on the upper surface of the sealing body. The slit extends radially inward of the case with respect to the second pressing part and opens at the side surface of the sealing body.

14 Claims, 3 Drawing Sheets

(51) Int. Cl.
*H01G 11/80* (2013.01)
*H01M 50/107* (2021.01)

(56) References Cited

U.S. PATENT DOCUMENTS

| | | | |
|---|---|---|---|
| 2010/0053847 A1* | 3/2010 | Tani | H01G 9/145 |
| | | | 361/505 |
| 2012/0250226 A1* | 10/2012 | Hirota | H01G 9/10 |
| | | | 361/518 |
| 2014/0240900 A1 | 8/2014 | Mori et al. | |
| 2014/0376159 A1* | 12/2014 | Vigneras | H01G 11/80 |
| | | | 29/25.03 |
| 2021/0343481 A1* | 11/2021 | Elekes | H01G 9/035 |

FOREIGN PATENT DOCUMENTS

| | | |
|---|---|---|
| JP | 6191015 B | 9/2017 |
| WO | 2013/073192 | 5/2013 |

* cited by examiner

POWER STORAGE DEVICE

TECHNICAL FIELD

The present disclosure relates to a power storage device.

BACKGROUND

Conventionally, there has been known a power storage device (for example, an electrolytic capacitor) including a power storage element, a case that houses the power storage element and has a bottomed tubular shape, and a sealing body that seals an opening of the case. As such a power storage device, there is a power storage device in which a groove such as a cross groove is formed on a case bottom surface as an explosion prevention mechanism. The bottom of the groove is inferior in strength to its periphery. Thus, when the case internal pressure rises, the case starts to tear from the groove, and the gas in the case escapes from the tear. This prevents rupture of the sealed part of the power storage device.

In order to reliably operate the explosion prevention mechanism including the groove, there is a safety margin between an allowable case internal pressure and an operating pressure of the explosion prevention mechanism as well as a safety margin between the operating pressure of the explosion prevention mechanism and a sealing strength. However, when the sealing body deteriorates, the sealing strength of the power storage device decreases, so that the case internal pressure when the sealed part ruptures decreases. On the other hand, the case internal pressure at which the explosion prevention mechanism including the groove operates does not change. Hence, depending on the deterioration state of the sealing body, there is a problem that the sealed part may rupture before the explosion prevention mechanism operates.

On the other hand, in the power storage device proposed in Japanese Patent No. 6191015, a groove or a slit extending from one of an upper end edge and a lower end edge to the other is formed on a side surface of the sealing body. While the groove or slit is normally closed, the groove or slit functions as an explosion prevention mechanism that opens when the internal pressure of the case abnormally rises, thereby releasing the gas in the case.

SUMMARY

Since the groove or the slit of Japanese Patent No. 6,191,015 is formed from the upper end edge to the lower end edge of the sealing body, there is a possibility that the groove or the slit opens even if the case internal pressure does not increase so much when the sealing body deteriorates over time or the like. That is, the explosion prevention mechanism of Japanese Patent No. 6191015 is a structure in which the operation reliability may decrease with the lapse of time. In such a situation, the present disclosure provides a power storage device including an explosion prevention mechanism capable of maintaining high operation reliability.

One aspect according to the present disclosure relates to a power storage device. The power storage device includes: a power storage element; that houses the power storage element, the case having a bottomed tubular shape and including an opening at one end of the case; and a sealing body that seals the opening. The case includes a first pressing part and a second pressing part in a vicinity of the opening. The first pressing part that-presses a side surface of the sealing body and protrudes to an inside of the case, and the second pressing part that presses an upper surface of the sealing body. The sealing body includes a slit on the upper surface of the sealing body. The slit extends radially inward of the case with respect to the second pressing part and opens at the side surface of the sealing body.

According to the present disclosure, it is possible to obtain the power storage device including the explosion prevention mechanism capable of maintaining high operation reliability.

DESCRIPTION OF EMBODIMENT

Figure 1:
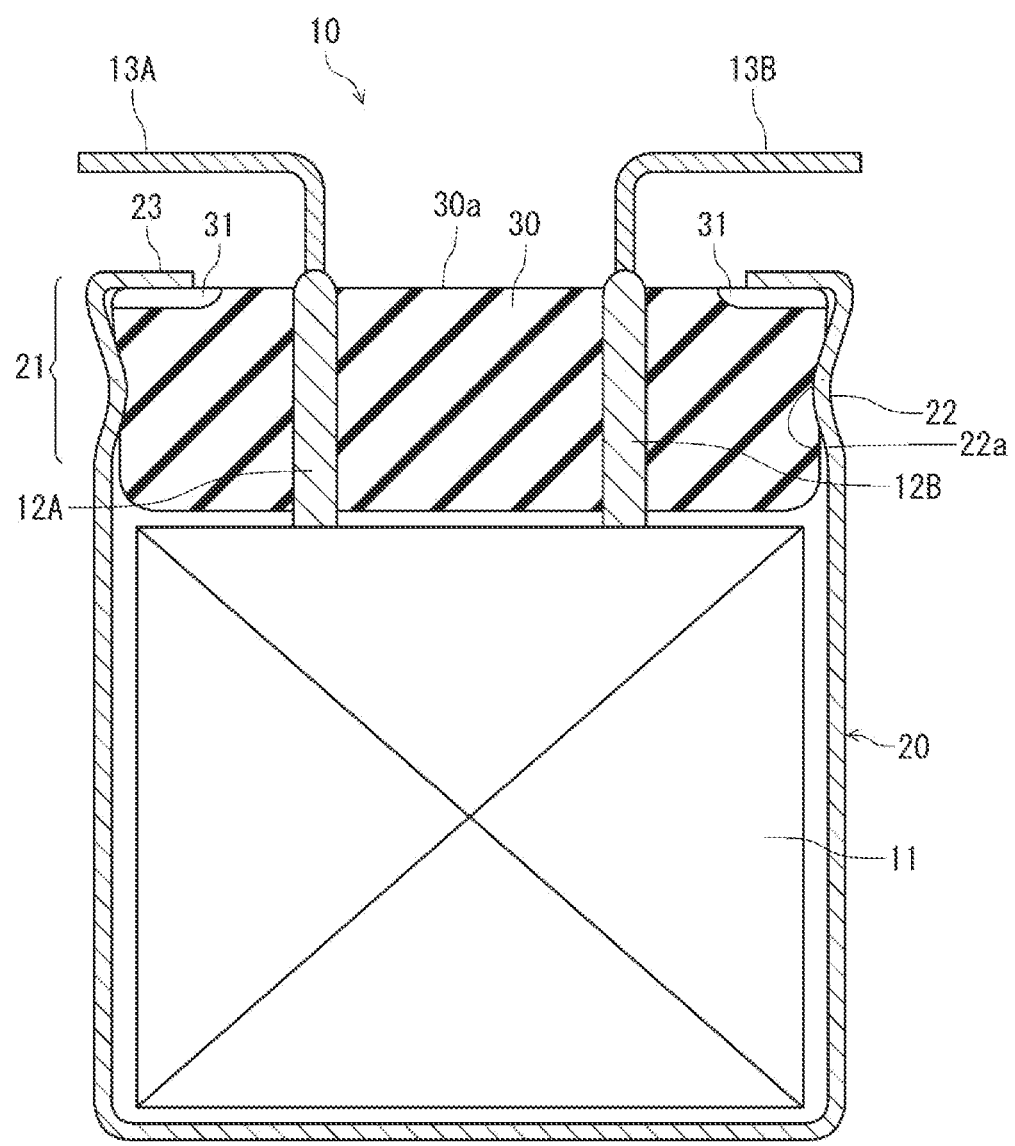
FIG. 1 is a cross-sectional view schematically illustrating an example of a power storage device according to the present disclosure, the cross-sectional view cut at a plane passing through a slit.

Hereinafter, an exemplary embodiment of a power storage device according to the present disclosure will be described by way of examples. However, the present disclosure is not limited to the examples described below. In the following description, specific numerical values and materials may be exemplified, but other numerical values and materials may be applied as long as the effects of the present disclosure can be obtained.

(Power Storage Device)

A power storage device according to the present disclosure includes a power storage element, a case, and a sealing body. These will be described below.

(Power Storage Element)

The power storage element includes an electrode, an electrolytic solution, and the like. For example, when the power storage device is an electrolytic capacitor, the power storage element includes a wound body. The wound body is formed by winding a pair of electrodes with a separator interposed therebetween. Each of the pair of electrodes may be a polarizable electrode, or one of the pair of electrodes may be an anode and the other may be a cathode. For example, when the power storage device is a secondary battery or a lithium ion capacitor, the power storage element includes an electrode group. The electrode group is formed by winding a positive electrode and a negative electrode with a separator interposed therebetween. The power storage element may further contain an electrolyte solution or a liquid component.

(Case)

The case houses the power storage element. The case has a bottomed tubular shape, and includes an opening at one end of the case. The case may be made of metal including, for example, aluminum, iron, nickel, or the like. The shape of the case is not particularly limited, but may be, for example, a bottomed cylindrical shape.

(Sealing Body)

The sealing body seals the opening of the case. The sealing body is made of an elastic material (for example, a material containing an elastic resin). The shape of the sealing body may correspond to the shape of the case. For example, when the case has a bottomed cylindrical shape, the sealing body may have a disk shape, and when the case has a bottomed rectangular tubular shape, the sealing body may have a rectangular plate shape.

As the elastic resin, a rubber component is preferable. As the rubber component, a butyl rubber (IIR), a nitrile rubber (NBR), an ethylene propylene rubber, an ethylene propylene diene rubber (EPDM), a chloroprene rubber (CR), an isoprene rubber (IR), a Hypalon™ rubber, a silicone rubber, a fluororubber, or the like can be used alone or in a blend. Among them, a butyl rubber, an ethylene propylene rubber, a fluororubber, and the like are preferable. In addition to the elastic resin, the elastic material may contain, as an optional component, a filler, carbon black, a processing aid, a cross-linking aid, and the like.

The case includes a first pressing part and a second pressing part in the vicinity of the opening.

The first pressing part presses a side surface of the sealing body to protrude to the inside of the case. The inner diameter at the most protruding apex of the first pressing part may be smaller than the outer diameter of the sealing body in a state where no load is applied. The first pressing part may be formed by, for example, grooving to reduce a diameter of a part of the opening.

The second pressing part is located closer to one end of the case, which is the opening of the case, than the first pressing part, and presses the edge of the sealing body toward the inside of the case. The second pressing part may be formed, for example, by curling an endmost part of the opening.

A slit is formed on an upper surface of the sealing body. The slit extends radially inward of the case with respect to the second pressing part. The slit is opened to a side surface of the sealing body. Here, the slit may be opened only a region above (at a side close to the opening) a position of the most protruding apex of the first pressing part on the side surface of the sealing body. The slit is not opened to the lower surface (the surface facing the inside of the case) of the sealing body. The slit may cause the inside and the outside of the case to communicate with each other when a force acting on the first pressing part from the sealing body falls below a predetermined value due to an increase in internal pressure of the case.

Here, when the internal pressure of the case increases, the sealing body expands toward the outside of the case in the axial direction of the case. When the expansion in the axial direction occurs, a region of the sealing body that is in contact with the first pressing part is displaced in a direction away from the first pressing part, so that a force (elastic repulsive force against compression) acting on the first pressing part from the sealing body is weakened. When the acting force is weakened to fall below a predetermined value, the gas in the case passes between the sealing body and the first pressing part. This gas escapes from the inside of the case to the outside of the case through the slit, whereby the internal pressure of the power storage device is reduced, and safety is secured.

As described above, the slit of the power storage device of the present disclosure does not open or close in accordance with the level of the case internal pressure. This point is different from the groove or slit of the power storage device of Japanese Patent No. 6191015. Alternatively, the slit of the power storage device of the present disclosure is itself always open. Therefore, there is no problem as in Japanese Patent No. 6191015 that the originally closed slit opens when the sealing body deteriorates over time. That is, even if the sealing body deteriorates over time, the function of the slit of the present disclosure as an explosion prevention mechanism is not substantially impaired.

As described above, according to the present disclosure, it is possible to obtain the power storage device including the explosion prevention mechanism capable of maintaining high operation reliability. Further, according to the present disclosure, the explosion prevention mechanism operates to prevent unexpected rupture of the power storage device in which the sealing body or the like scatters.

A plurality of slits may be provided. When a plurality of slits are provided, the plurality of slits may be disposed at equal intervals in the circumferential direction of the case. As a result, the sealing body is prevented from being asymmetrically deformed, and the operation reliability of the explosion prevention mechanism including the slit is enhanced.

Hereinafter, an example of the power storage device according to the present disclosure will be specifically described with reference to the drawing. The above-described components can be applied to the components of the power storage device as an example described below. The components of the power storage device as an example described below can be changed based on the above description. In addition, the matters described below may be applied to the exemplary embodiment described above. Among the components of the power storage device as an example described below, components that are not essential to the power storage device according to the present disclosure may be omitted. Note that the following drawings are schematic and do not accurately reflect the shape and number of actual members.

As illustrated in FIG. 1, power storage device 10 is configured as an electrolytic capacitor, and includes power storage element 11, case 20, and sealing body 30.

Power storage element 11 includes a wound body. The wound body is formed by winding an anode foil and a cathode foil with a separator interposed therebetween. One ends of lead tabs 12A and 12B are connected to the anode foil and the cathode foil, respectively.

The wound body is configured while winding lead tabs 12A and 12B. Lead wires 13A and 13B are connected to other ends of lead tabs 12A and 12B, respectively.

Case 20 has a bottomed tubular shape, includes opening 21 at one end, and houses power storage element 11. Case 20 of the present exemplary embodiment is made of aluminum, but is not limited thereto. Case 20 of the present exemplary embodiment has a bottomed tubular shape, but is not limited thereto. The axial length of case 20 may range, for example, from 60 mm to 80 mm, inclusive, in a state before first pressing part 22 and second pressing part 23 described later are formed. The outer diameter of case 20 may range, for example, from 16 mm to 20 mm, inclusive.

Sealing body 30 seals opening 21 of case 20. Sealing body 30 of the present exemplary embodiment has a disk shape, but is not limited thereto. Sealing body 30 may have a thickness (a length in the axial direction of case 20) ranging, for example, from 3 mm to 7 mm, inclusive. Sealing body 30 may be made of an elastic body containing rubber as a main component.

Opening 21 of case 20 includes first pressing part 22 and second pressing part 23.

First pressing part 22 presses a side surface of sealing body 30 in the vicinity of opening 21, and protrudes to the inside of case 20. The inner diameter at apex 22a of first pressing part 22 is smaller than the outer diameter of sealing body 30 in a state where no load is applied. First pressing part 22 of the present exemplary embodiment is formed by grooving to reduce the diameter of a part of opening 21, but is not limited thereto.

Second pressing part 23 is disposed on one end side (that is, the opening side) of case 20 with respect to first pressing part 22, and presses the edge of sealing body 30. In other words, second pressing part 23 presses upper surface 30a of sealing body 30 in the vicinity of opening 21. Second pressing part 23 of the present exemplary embodiment is formed by curling a part of opening 21, but is not limited thereto.

Figure 2:
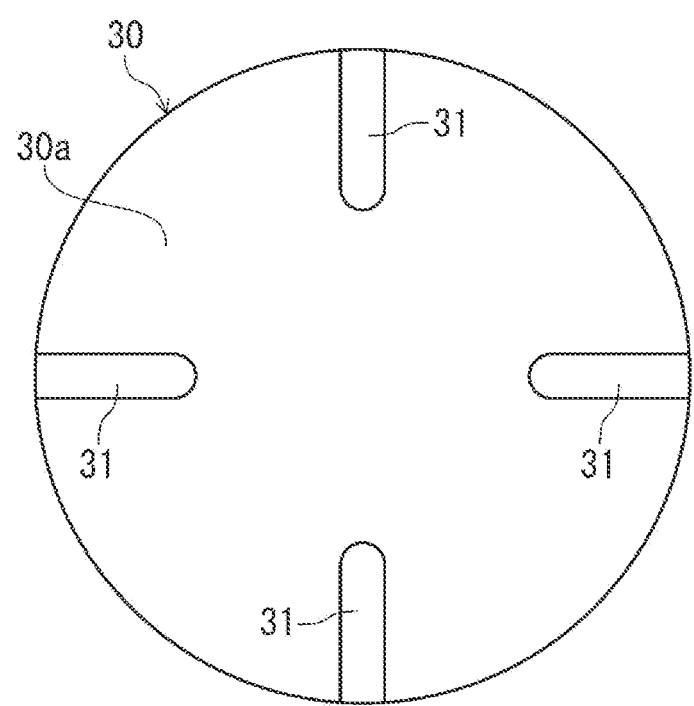
FIG. 2 is a plan view schematically illustrating a sealing body.

As illustrated in FIGS. 1 and 2, slits 31 are formed on upper surface 30a of sealing body 30. Slits 31 extend radially inward of case 20 with respect to second pressing part 23 and communicate with the external space of case 20. For example, slits 31 may extend radially inward by a length ranging from 0.2 mm to 2.0 mm, inclusive, from the radially inner end of second pressing part 23. Slits 31 extend along the radial direction of case 20. Alternatively, slits 31 may not extend along the radial direction of case 20.

Slits 31 are open to a side surface of sealing body 30. Here, slits 31 are opened only in a region above a position of most protruding apex 22a of first pressing part 22 on the side surface of sealing body 30. Apex 22a of first pressing part 22 is an important part for ensuring airtightness of case 20, and it is advantageous that slits 31 are not opened at the position of apex 22a from the viewpoint of ensuring the airtightness. Slits 31 are not opened to the lower surface of sealing body 30.

As illustrated in FIG. 2, in the present exemplary embodiment, four slits 31 are provided, but the number of slits 31 may be three or less or five or more. Four slits 31 are disposed at equal intervals (in this example, every 90°) in the circumferential direction of case 20. Alternatively, the plurality of slits 31 may not be disposed at equal intervals. In FIG. 2, through holes through which lead tabs 12A and 12B pass are not illustrated.

A part of opening 21 that is located at a side close to the opening with respect to apex 22a of first pressing part 22 may not partially come into contact with sealing body 30. That is, in the part located at a side close to the opening with respect to apex 22a of first pressing part 22, a gap may exist between the inner surface of opening 21 and the side surface of sealing body 30. When the gap exists, slits 31 may communicate with the gap.

The depth of slits 31 (the length in the direction parallel to the axial direction of case 20) may range, for example, from 0.25×D to 0.9×D, inclusive, where D is a distance from the upper surface of sealing body 30 to a position of apex 22a of first pressing part 22. The distance D in the present exemplary embodiment may range, for example, from 2 mm to 5 mm, inclusive. The width of slits 31 (the length in the circumferential direction of case 20) may range, for example, from 0.2 mm to 0.5 mm, inclusive.

Slits 31 allow the inside and the outside of case 20 to communicate with each other when a force acting on first pressing part 22 from sealing body 30 falls below a predetermined value due to an increase in internal pressure of case 20. On the other hand, when the acting force is a predetermined value or more, slits 31 do not allow the inside and the outside of case 20 to communicate with each other.

Figure 3:
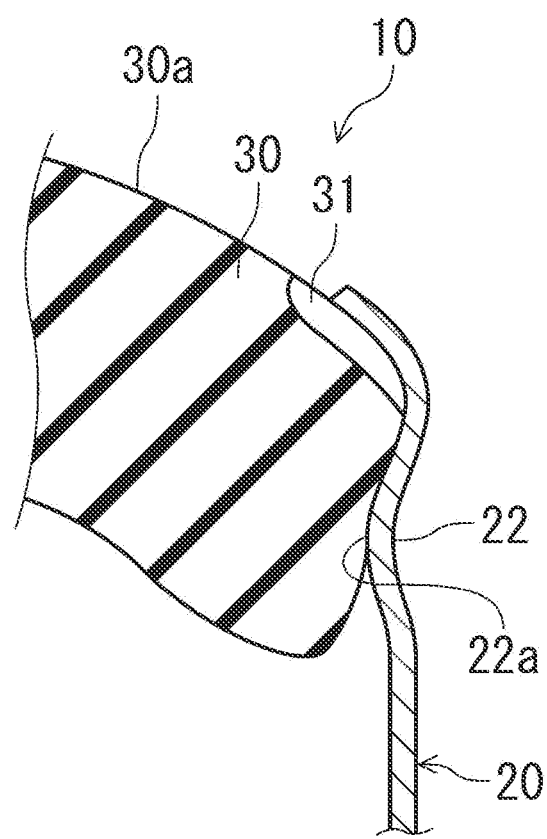
FIG. 3 is an enlarged cross-sectional view illustrating a main part of the power storage device when an internal pressure of a case is increased.

Here, as illustrated in FIG. 3, when the internal pressure of case 20 increases, sealing body 30 expands toward the outside of case 20 in the axial direction of case 20. When the expansion in the axial direction occurs, a region of sealing body 30 that is in contact with first pressing part 22 is displaced in a direction away from first pressing part 22 (that is, the inner side in the radial direction), so that a force (elastic repulsive force against compression) acting on first pressing part 22 from sealing body 30 is weakened. When the acting force is weakened to fall below a predetermined value, the gas in case 20 passes between sealing body 30 and first pressing part 22. This gas escapes from the inside of case 20 to the outside of case 20 through slits 31, whereby the safety of power storage device 10 is secured.

EXAMPLES

For power storage devices 10 of Examples 1 to 3 and Comparative Examples 1 and 2 described below, the relationship between a depth of slits 31 and an operating pressure of an explosion prevention mechanism was measured. Here, the operating pressure of the explosion prevention mechanism is the internal pressure of case 20 when the inside and the outside of case 20 communicate with each other through slits 31 when the internal pressure of case 20 increases.

Example 1

The outer diameter of case 20 made of aluminum was set to 18 mm, the axial length of case 20 before first pressing part 22 and second pressing part 23 were formed was set to 70 mm, and the axial distance from upper surface 30a of sealing body 30 to apex 22a of first pressing part 22 was set to 3.5 mm. The thickness of sealing body 30 made of butyl rubber was set to 7 mm, and the outer diameter of sealing body 30 before compression was set to 17.1 mm. The width of slits 31 was set to 0.3 mm, and the depth of slits 31 was set to 1.11 mm. The operating pressure of the explosion prevention mechanism was 2.15 MPa.

Example 2

The depth of slits 31 was set to 2.56 mm, and the other configurations were the same as those of Example 1. The operating pressure of the explosion prevention mechanism was 1.94 MPa.

Example 3

The depth of slits 31 was set to 3.20 mm, and the other configurations were the same as those of Example 1. The operating pressure of the explosion prevention mechanism was 1.86 MPa.

Comparative Example 1

The depth of slits 31 was set to 3.87 mm, and the other configurations were the same as those of Example 1. The operating pressure of the explosion prevention mechanism was 0.42 MPa.

Comparative Example 2

The depth of slits 31 was set to 5.09 mm, and the other configurations were the same as those of Example 1. The operating pressure of the explosion prevention mechanism was 0.19 MPa.

As described above, a large difference was observed in the operating pressure of the explosion prevention mechanism between Examples 1 to 3 and Comparative Examples 1 and 2. As long as a desired operation is obtained, the operating pressure of the explosion prevention mechanism is preferably high, and it can be said that the superiority of Examples 1 to 3 is shown.

The present disclosure can be applied to a power storage device.

The invention claimed is:

1. A power storage device comprising:
   a power storage element;
   a case that houses the power storage element, the case having a bottomed tubular shape and including an opening at one end of the case; and
   a sealing body that seals the opening, the sealing body including an elastic resin, wherein:
   the case includes a first pressing part and a second pressing part in a vicinity of the opening,
   the first pressing part presses a side surface of the sealing body and protrudes to an inside of the case,
   the second pressing part presses an upper surface of the sealing body,
   the sealing body includes a slit on the upper surface of the sealing body,
   the power storage element as a whole is disposed under the sealing body,
   the slit extends radially inward of the case with respect to the second pressing part and opens at the side surface of the sealing body, and
   the sealing body is configured to deform such that, by an increase in an internal pressure of the case, a gap is formed between the side surface of the sealing body and the inside of the case at the first pressing portion to allow a gas in the case to escape to an outside of the case through the gap, while maintaining a lower surface of the sealing body opposite to the upper surface being located below the first pressing portion.

2. The power storage device according to claim 1, wherein the slit is opened only in a region above a position of a most protruding apex of the first pressing part on the side surface of the sealing body.

3. The power storage device according to claim 1, wherein the sealing body includes a plurality of slits each being the slit.

4. The power storage device according to claim 3, wherein the plurality of slits are disposed at equal intervals in a circumferential direction of the case.

5. The power storage device according to claim 1, further comprising a positive lead tab and a negative lead tab, and the positive lead tab and the negative lead tab penetrate the sealing body and connect to positive electrode and negative electrode of the power storage element, respectively.

6. The power storage device according to claim 1, wherein the case is made of aluminum, iron, or nickel.

7. The power storage device according to claim 1, wherein:
   an entirety of an area covered by the case in the upper surface of the sealing body other than an area of the slit is in contact with the second pressing part, and
   a space exists between the side surface of the sealing body and the inside of the case at a position upper than a position of a most protruding apex of the first pressing portion.

8. The power storage device according to claim 1, wherein:
   an entirety of an area covered by the case in the upper surface of the sealing body other than an area of the slit is in contact with the second pressing part, and
   in a cross-section including a center of the sealing body and a center of the power storage element, an empty area that is surrounded by the second pressing part, a part upper than a position of a most protruding apex of the first pressing portion in the case, and the side surface of the sealing body exists.

9. The power storage device according to claim 1, wherein the slit extends radially inward by a length ranging from 0.2 mm to 2.0 mm, inclusive, from a radially inner end of the second pressing part.

10. The power storage device according to claim 1, wherein a depth of the slit is more than or equal to $0.25 \times D$ and less than or equal to $0.9 \times D$, where D is a distance from the upper surface of the sealing body to a position of a most protruding apex of the first pressing part.

11. The power storage device according to claim 1, wherein a depth of the slit is more than or equal to $0.31 \times D$ and less than or equal to $0.9 \times D$, where D is a distance from the upper surface of the sealing body to a position of a most protruding apex of the first pressing part.

12. The power storage device according to claim 1, wherein the sealing body is configured to deform such that the upper surface of the sealing body protrudes toward an outside of the case by the increase in the internal pressure.

13. The power storage device according to claim 1, wherein the sealing body is configured to deform such that the lower surface of the sealing body protrudes toward an outside of the case by the increase in the internal pressure.

14. The power storage device according to claim 1, wherein:
   a lead tab is connected to the power storage element,
   a lead wire is connected to the lead tab and is thinner than the lead tab, and
   the lead tab protrudes from the sealing body.

* * * * *